United States Patent
Lin et al.

(10) Patent No.: US 12,445,386 B2
(45) Date of Patent: Oct. 14, 2025

(54) MESH NETWORK SYSTEM AND COMMUNICATION METHOD OF THE SAME HAVING DATA FLOW TRANSMISSION SORTING MECHANISM

(71) Applicant: REALTEK SEMICONDUCTOR CORPORATION, Hsinchu (TW)

(72) Inventors: Chiao-Yi Lin, Hsinchu (TW); Kuo-Cheng Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 238 days.

(21) Appl. No.: 17/985,177

(22) Filed: Nov. 11, 2022

(65) Prior Publication Data
US 2023/0155946 A1    May 18, 2023

(30) Foreign Application Priority Data
Nov. 15, 2021    (TW) ................................. 110142393

(51) Int. Cl.
*H04L 47/2425*    (2022.01)
*H04L 47/6275*    (2022.01)

(52) U.S. Cl.
CPC ...... *H04L 47/2433* (2013.01); *H04L 47/6275* (2013.01)

(58) Field of Classification Search
CPC .......................... H04L 47/2433; H04L 47/6275
See application file for complete search history.

(56) References Cited

U.S. PATENT DOCUMENTS

| | | | |
|---|---|---|---|
| 8,327,002 B1 * | 12/2012 | Van Dussen ............ | H04L 41/00 370/242 |
| 2003/0152083 A1 * | 8/2003 | Nagata .................. | H04W 28/02 370/335 |

(Continued)

OTHER PUBLICATIONS

LAN/MAN Standards Committee, "Part 11: Wireless LAN Medium Access Control (MAC) and Physical Layer (PHY) specifications Amendment 10: Mesh Networking", Sep. 10, 2011, IEEE 802.11s, the Wireless mesh networking.

(Continued)

*Primary Examiner* — William G Trost, IV
*Assistant Examiner* — Abdelbasst Talioua
(74) *Attorney, Agent, or Firm* — WPAT, PC

(57) ABSTRACT

The present invention discloses a mesh network system having data flow transmission sorting mechanism that includes station devices, mesh network devices and a portal network apparatus. The portal network device is configured to manage the station devices to perform communication with an external network through the mesh network devices and the portal network device, to detect outward data flows and inward data flows related to the station devices, to perform priority ranking on the outward data flows and the inward data flows according to device priority information and relative flow amount information to generate outward priority ranking information and inward priority ranking information, and to transmit the outward priority ranking information and inward priority ranking information to the mesh network devices such that the mesh network system transmits the outward data flows and the inward data flows respectively according to the outward priority ranking information and inward priority ranking information.

14 Claims, 2 Drawing Sheets

(56) References Cited

U.S. PATENT DOCUMENTS

| | | | |
|---|---|---|---|
| 2003/0204512 A1* | 10/2003 | Atarashi | H04L 47/2441 |
| 2007/0201499 A1* | 8/2007 | Kapoor | H04L 47/2408 |
| | | | 370/412 |
| 2012/0201138 A1* | 8/2012 | Yu | H04L 47/2491 |
| | | | 370/235 |
| 2013/0070599 A1* | 3/2013 | Xu | H04L 47/2433 |
| | | | 370/235 |
| 2013/0070600 A1* | 3/2013 | Nakajima | H04L 47/822 |
| | | | 370/235 |
| 2013/0322244 A1* | 12/2013 | Matthews | C07D 239/38 |
| | | | 370/235 |
| 2014/0032591 A1* | 1/2014 | Li | H04L 63/0236 |
| | | | 707/769 |
| 2014/0059216 A1* | 2/2014 | Jerrim | H04L 67/104 |
| | | | 709/224 |
| 2014/0078903 A1* | 3/2014 | Edsall | H04L 47/29 |
| | | | 370/252 |
| 2014/0133305 A1* | 5/2014 | Brolin | H04L 47/31 |
| | | | 370/235 |
| 2014/0146740 A1* | 5/2014 | Yamashina | H04L 45/308 |
| | | | 370/315 |
| 2014/0211624 A1* | 7/2014 | Rajasekaran | H04L 47/30 |
| | | | 370/235 |
| 2014/0269705 A1* | 9/2014 | DeCusatis | H04L 45/64 |
| | | | 370/392 |
| 2014/0279850 A1* | 9/2014 | Goyal | G06F 16/11 |
| | | | 707/609 |
| 2014/0313892 A1* | 10/2014 | Kamble | H04L 45/64 |
| | | | 370/235 |
| 2016/0020981 A1* | 1/2016 | Raney | H04L 45/02 |
| | | | 709/224 |
| 2016/0112305 A1* | 4/2016 | Djekic | H04L 47/6215 |
| | | | 370/235 |
| 2017/0019303 A1* | 1/2017 | Swamy | H04L 47/20 |
| 2018/0159780 A1* | 6/2018 | Essigmann | H04L 47/263 |
| 2019/0044852 A1* | 2/2019 | Nolan | H04L 63/0227 |
| 2019/0230645 A1* | 7/2019 | Cheng | H04W 12/08 |
| 2020/0162371 A1* | 5/2020 | Musku | H04L 45/04 |
| 2021/0117360 A1* | 4/2021 | Kutch | G06F 3/0656 |
| 2021/0152494 A1* | 5/2021 | Johnsen | H04L 47/805 |
| 2021/0226894 A1* | 7/2021 | Shen | H04L 45/24 |
| 2021/0320873 A1* | 10/2021 | LaPierre | H04L 47/2433 |
| 2022/0045972 A1* | 2/2022 | Aibester | H04L 47/30 |
| 2022/0417942 A1* | 12/2022 | Zhang | H04W 72/569 |
| 2023/0021077 A1* | 1/2023 | Divakaran | H04W 52/26 |
| 2023/0080739 A1* | 3/2023 | Taskin | H04W 84/12 |
| | | | 370/252 |
| 2023/0362057 A1* | 11/2023 | Hu | H04L 43/20 |

OTHER PUBLICATIONS

Binfeng Wang et al., "A survey of elephant flow detection in SDN", 2018, (IEEE).

Ran Ben Basat et al., "Optimal Elephant Flow Detection", Jan. 15, 2017, arXiv:1701.04021v1 [cs.DS].

Peng Xiao et al., "An efficient elephant flow detection with cost-sensitive in SDN", (IEEE), INISCom 2015, March 02-04, Tokyo, Japan, 2015 ICST.

* cited by examiner

MESH NETWORK SYSTEM AND COMMUNICATION METHOD OF THE SAME HAVING DATA FLOW TRANSMISSION SORTING MECHANISM

BACKGROUND OF THE INVENTION

1. Field of the Invention

The present invention relates to a mesh network system and a mesh network communication method of the same having data flow transmission sorting mechanism.

2. Description of Related Art

Network topology is the arrangement of the elements of a communication network and is used to define or describe the arrangement of various types of telecommunication networks. A wide variety of network topologies can be used, including more conventional topologies of star and tree. Mesh network is also one of the network topologies.

Mesh topology may be contrasted with conventional star/tree network topologies in which each of nodes therein can serve as a router or a terminal device. The nodes can be connected to each other to perform communication like a mesh. However, when a multiple of data flows are transmitted, the priorities of these data flows are not defined. The network transmission efficiency decreases since the data flows are not transmitted according to the priorities thereof.

SUMMARY OF THE INVENTION

In consideration of the problem of the prior art, an object of the present invention is to supply a mesh network system and a mesh network system communication method of the same having data flow transmission sorting mechanism.

The present invention discloses a mesh network system having data flow transmission sorting mechanism that includes a plurality of computing devices, a plurality of mesh network devices and a portal network device electrically coupled between an external network and the mesh network devices. The portal network device is configured to manage the computing devices to perform communication with the external network through the mesh network devices and the portal network apparatus, detect a plurality of outward data flows and a plurality of inward data flows related to the computing devices, perform priority ranking on the outward data flows and the inward data flows according to device priority information and relative flow amount information that the outward data flows and the inward data flows correspond to, so as to generate outward priority ranking information and inward priority ranking information and transmit the outward priority ranking information and the inward priority ranking information to the mesh network devices such that the mesh network system transmits the outward data flows and the inward data flows respectively according to the outward priority ranking information and the inward priority ranking information.

The present invention also discloses a mesh network system communication method having data flow transmission sorting mechanism that includes steps outlined below. A plurality of computing devices are managed to perform communication with an external network through a plurality of mesh network devices and a portal network device by a portal network device connected between the external network and the mesh network devices. A plurality of outward data flows and a plurality of inward data flows related to the computing devices are detected by the portal network apparatus. Priority ranking is performed on the outward data flows and the inward data flows according to device priority information and relative flow amount information that the outward data flows and the inward data flows correspond to by the portal network device, so as to generate outward priority ranking information and inward priority ranking information. The outward priority ranking information and the inward priority ranking information are transmitted to the mesh network devices by the portal network device such that the mesh network system transmits the outward data flows and the inward data flows respectively according to the outward priority ranking information and the inward priority ranking information.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a mesh network system and a mesh network system communication method of the same having data flow transmission sorting mechanism to determine a priority rank of outward data flows and inward data flows according to the detection of the portal network device such that the priority ranking information is transmitted to mesh network devices in the mesh network system to allow the whole mesh network system to perform transmission of the outward data flows and the inward data flows according to the priority ranking information. The data transmission efficiency of the whole system is thus increased.

Figure 1:
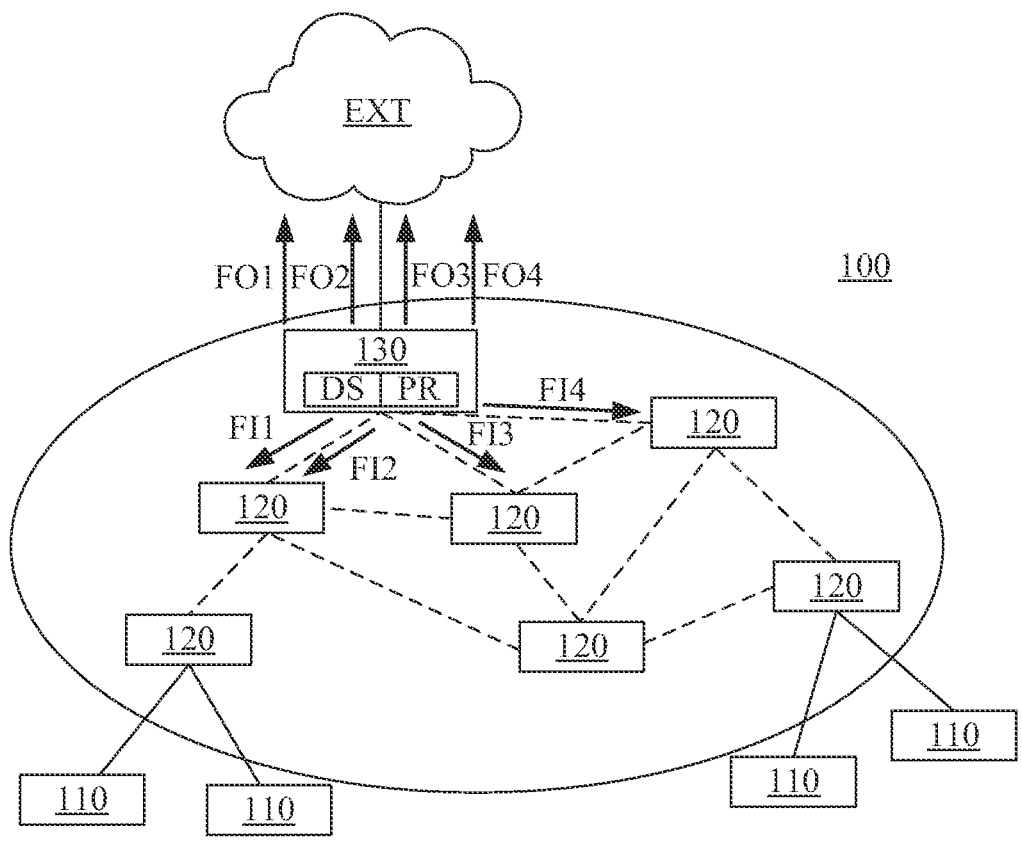
FIG. 1 illustrates a block diagram of a mesh network system having data flow transmission sorting mechanism according to an embodiment of the present invention.

Reference is now made to FIG. 1. FIG. 1 illustrates a block diagram of a mesh network system 100 having data flow transmission sorting mechanism according to an embodiment of the present invention. The mesh network system 100 includes a plurality of computing devices 110, a plurality of mesh network devices 120 and a portal network device 130.

The computing devices 110 are station devices including such as, but not limited to a smartphone, a tablet PC, a notebook PC or a desktop equipped with network communication function. Each of the mesh network devices 120 and the portal network device 130 can be an access point. The mesh network devices 120 can establish such as, but not limited to mesh links therebetween, in which these mesh links are illustrated as dashed lines in FIG. 1, by using the wireless network. The computing devices 110 and the mesh network devices 120 can establish such as, but not limited to basic service set (BSS) links therebetween, in which these BSS links are illustrated as solid lines in FIG. 1. The portal network device 130 is connected between an external network EXT and the mesh network devices 120. The portal network device 130 includes a processor for performing operation and a transceiver for performing communication.

By using the network connection method described above, the portal network device 130 manages the computing devices 110 to perform communication with the external network EXT through the mesh network devices 120 and the portal network device 130.

The portal network device 130 is configured to detect a plurality of outward data flows FO1~FO4 and a plurality of inward data flows FI1~FI4 related to the computing devices 110.

The data flows transmitted in the mesh network system 100 can be established by such as, but not limited to the computing devices 110 according to the programs operated therein. The data flows can be used to perform transmission of audio data, video data or other types of data.

Since the mesh network system 100 has to perform communication with the external network EXT through the portal network device 130, the portal network device 130 can detect all the data flows transmitted between the portal network device 130 and the external network EXT. According to the data transmission direction, the data flows can be distinguished into the outward data flows FO1~FO4 and the inward data flows FI1~FI4 illustrated in FIG. 1.

The outward data flows FO1~FO4 are the data flows transmitted from internal nodes of the mesh network system 100 to the external network EXT, such as but not limited to the data flows transmitted from the computing devices 110, through the mesh network devices 120 and the portal network device 130, and to the external network EXT. The inward data flows FI1~FI4 are the data flows transmitted from the external network EXT to the internal nodes of the mesh network system 100, such as but not limited to the data flows transmitted from the external network EXT, through the portal network device 130 and the mesh network devices 120, and to the computing devices 110.

The portal network device 130 is configured to perform priority ranking on the outward data flows FO1~FO4 and the inward data flows FI1~FI4 according to device priority information and relative flow amount information (not illustrated in the figure) that the outward data flows FO1~FO4 and the inward data flows FI1~FI4 correspond to, so as to generate outward priority ranking information PR and inward priority ranking information DS.

In an embodiment, the computing devices 110 can be set to be in a station device white list, to be in a station device black list or to be not in either of these two lists. The portal network device 130 is configured to determine the device priority information according to whether the computing devices 110 that outward data flows FO1~FO4 and the inward data flows FI1~FI4 correspond to is in the station device white list or the station device black list.

In an embodiment, the portal network device 130 determines that a data flow that one of the computing devices 110 in the station device white list establishes has a relatively higher priority, determines that a data flow that one of the computing devices 110 in the station device black list establishes has a relatively lower priority, and determines that a data flow that one of the computing devices 110 not in the either lists has a priority between the two priorities described above.

In an embodiment, the content of the station device white list and the station device black list is recorded according to identification information of the computing devices 110, such as but not limited to a media access control (MAC) address. As a result, the portal network device 130 determines whether the computing devices 110 are in the station device white list or the station device black list according to a comparison between the identification information of each of the computing devices 110 that the outward data flows FO1~FO4 and the inward data flows FI1~FI4 correspond to and the recorded content of the station device white list and the station device black list.

In an embodiment, the portal network device 130 is configured to determine the relative flow amount information according to a relative flow amount between each two of the outward data flows FO1~FO4 and inward data flows FI1~FI4. For example, some data flows are used to transmit videos and have relative larger flow amounts. Some data flows are used to transmit audios and have relative smaller flow amounts.

In an embodiment, the portal network device 130 determines that a data flow having a relatively smaller flow amount has a higher priority and determines that a data flow having a relatively larger flow amount has a lower priority.

The portal network device 130 further performs priority ranking, according to the device priority information and the relative flow amount information, to rank the outward data flows FO1~FO4 and inward data flows FI1~FI4 that correspond to conditions in an order of being in the station device white list, having a relatively smaller flow amount, having a relatively larger flow amount and being in the station device black list from a highest rank to a lowest rank. According to the ranking result, the portal network device 130 generates the outward priority ranking information PR and the inward priority ranking information DS.

The processing of the portal network device 130 performed on the outward data flows FO1~FO4 is described first in the following paragraphs.

In an embodiment, the outward priority ranking information PR is used to assign a priority order value to each of the outward data flows FO1~FO4.

For example, according to the device priority information and the relative flow amount information, the outward data flow FO1 has a relatively smaller flow amount and is not in any list, the outward data flow FO2 is in the station device black list, the outward data flow FO3 has a relatively larger flow amount and is not in any list and the outward data flow FO4 is in the station device white list.

As a result, the ranking result generated by the portal network device 130 ranks the outward data flows from the highest priority to the lowest priority as the outward data flows FO4, FO1, FO3 and FO2. Under such a condition, the portal network device 130 assigns the priority order values 3, 2, 1 and 0 respectively to the outward data flows FO4, FO1, FO3, FO2 and records the result in the outward priority ranking information PR.

The processing of the portal network device 130 performed on the inward data flows FI1~FI4 is described subsequently in the following paragraphs.

In an embodiment, the inward priority ranking information DS is used to assign an entry value corresponding to a class entry to each of the inward data flows FI1~FI4. The class entry is a differentiated services code point (DSCP) entry of an Internet protocol (IP) header of the packets.

For example, accordingly to the device priority information and the relative flow amount information, the inward data flow FI1 has a relatively smaller flow amount and is not in any list, the inward data flow FI2 is in the station device black list, the inward data flow FI3 has a relatively larger flow amount and is not in any list and the inward data flow FI4 is in the station device white list.

As a result, the ranking result generated by the portal network device 130 ranks the inward data flows from the highest priority to the lowest priority as the inward data flows FI4, FI1, FI3 and FI2. Under such a condition, the portal network device 130 assigns the entry values 48, 32, 0 and 8 respectively to the inward data flows FI4, FI1, FI3, FI2 based on the DSCP entry and records the result in the inward priority ranking information DS.

In an embodiment, the portal network device 130 transmits the outward priority ranking information PR and the inward priority ranking information DS to the mesh network devices 120. It is appreciated that in order to keep the figure clear, the outward priority ranking information PR and the inward priority ranking information DS is illustrated to be only within the portal network device 130 in FIG. 1. Actually, after the transmission of the portal network device 130, each of the mesh network devices 120 stores the outward priority ranking information PR and the inward priority ranking information DS.

The mesh network system 100 transmits the outward data flows FO1~FO4 and inward data flows FI1~FI4 according to the outward priority ranking information PR and the inward priority ranking information DS.

According to the outward priority ranking information PR, the mesh network system 100 that includes the portal network device 130 and the mesh network devices 120 set a priority queue according to the priority order value of each of the outward data flows FO1~FO4 to perform packet transmission. As a result, when the devices described above receive the packets of the data flows, the devices performs transmission according to an order of the outward data flows FO4, FO1, FO3 and FO2 from the highest priority to the lowest priority according to the priority order values thereof, which are 3, 2, 1 and 0.

On the other hand, according to the inward priority ranking information DS, the portal network device 130 sets the entry value corresponding to the class entry, e.g., DSCP entry, of each of a plurality of packets of each of the inward data flows FI1~FI4 to perform packet transmission with the mesh network devices 120 and the computing devices 110. As a result, the mesh network devices 120 perform packet transmission based on a Wi-Fi multimedia (WMM) access class that the entry value of the DSCP entry, assigned according to the inward priority ranking information DS, corresponds to.

More specifically, the communication standard, such as but not limited to IEEE 802.11e, defines the mapping relation between the DSCP entry and the WMM access class. When the entry value is 48, the WMM access class corresponds to "voice". When the entry value is 32, the WMM access class corresponds to "video". When the entry value is 0, the WMM access class corresponds to "best effort". When the entry value is 8, the WMM access class corresponds to "background".

The priority ranking of the WMM access classes described above from the highest ranking to the lowest ranking is "audio", "video", "best effort" and "background".

As a result, upon receiving the packets of the inward data flows FI1~FI4, the mesh network devices 120 that have the inward priority ranking information DS can map the entry values of the DSCP entry of each of the packets to the corresponding WMM access classes and perform packet transmission of the data flows accordingly.

By using the mechanism described above, the mesh network system 100 can determine the priority rank of the outward data flows and the inward data flows according to the detection of the portal network device such that the priority ranking information is transmitted to the mesh network devices in the mesh network system to allow the whole mesh network system to perform transmission of the outward data flows and the inward data flows according to the priority ranking information. The data transmission efficiency of the whole system is thus increased.

It is appreciated that the priority ranking performed based on the priority order value and the DSCP entry described above is merely an example. In other embodiment, the mesh network system 100 may use other methods to set the priority of the outward data flows and the inward data flows. The present invention is not limited thereto.

Figure 2:
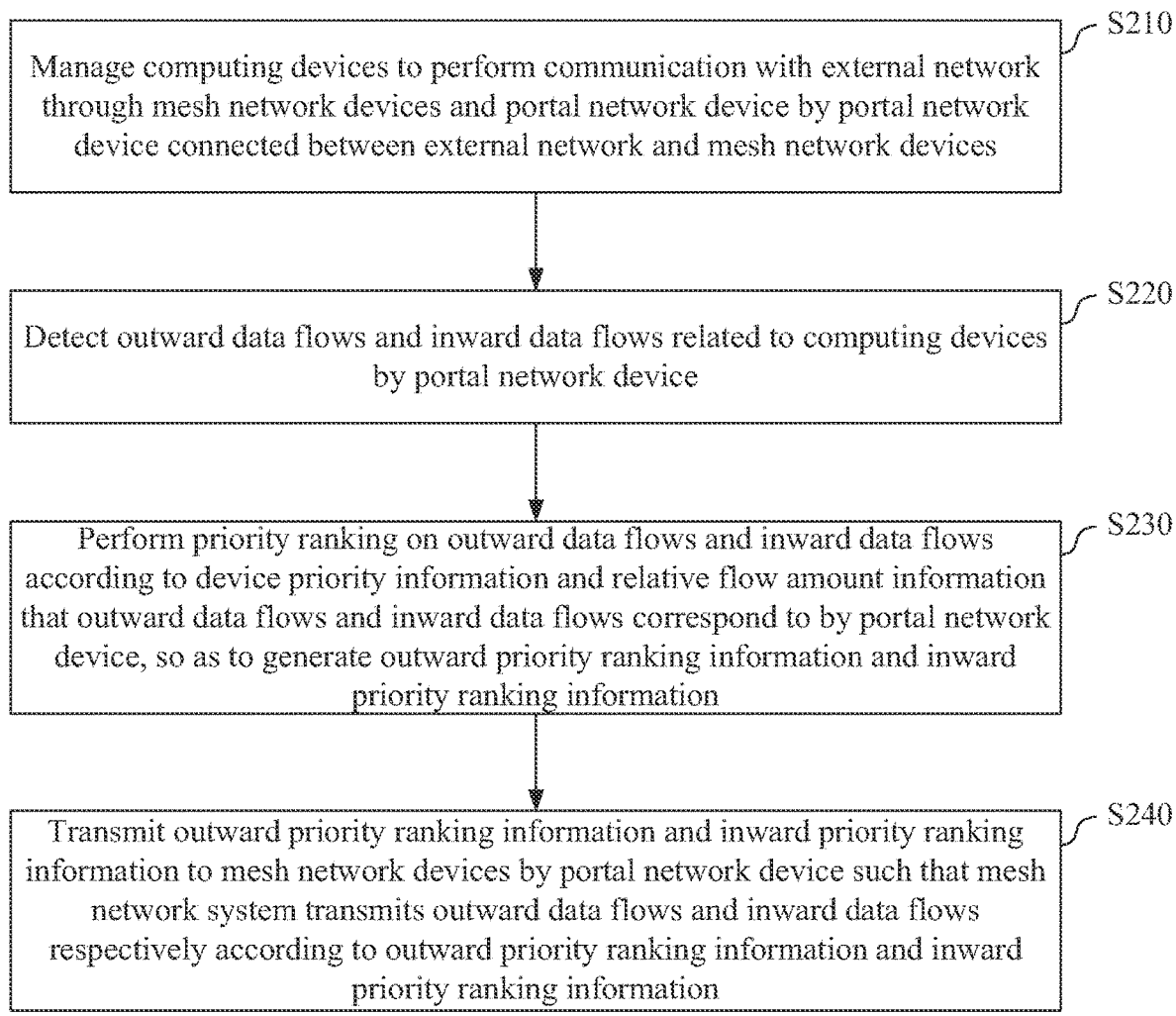
FIG. 2 illustrates a flow chart of a clock data recovery method having quick locking and bandwidth stabilizing mechanism according to an embodiment of the present invention.

Reference is now made to FIG. 2. FIG. 2 illustrates a flow chart of a mesh network system communication method 200 having data flow transmission sorting mechanism according to an embodiment of the present invention.

In addition to the device described above, the present disclosure further provides the mesh network system communication method 200 having data flow transmission sorting mechanism that can be used in such as, but not limited to, the mesh network system 100 in FIG. 1. As illustrated in FIG. 2, an embodiment of the mesh network system communication method 200 includes the following steps.

In step S210, the computing devices 110 are managed to perform communication with the external network EXT through the mesh network devices 120 and the portal network device 130 by the portal network device 130 connected between the external network EXT and the mesh network devices 120.

In step S220, the outward data flows FO1~FO4 and the inward data flows FI1~FI4 related to the computing devices 110 are detected by the portal network device 130.

In step S230, the priority ranking is performed on the outward data flows FO1~FO4 and the inward data flows FI1~FI4 according to the device priority information and the relative flow amount information that the outward data flows FO1~FO4 and the inward data flows FI1~FI4 correspond to by the portal network device 130, so as to generate the outward priority ranking information PR and inward priority ranking information DS.

In step S240, the outward priority ranking information RP and the inward priority ranking information DS are transmitted to the mesh network devices 120 by the portal network device 130 such that the mesh network system 100 transmits the outward data flows FO1~FO4 and the inward data flows FI1~FI4 respectively according to the outward priority ranking information PR and the inward priority ranking information DS.

It is appreciated that the embodiments described above are merely an example In other embodiments, it should be appreciated that many modifications and changes may be made by those of ordinary skill in the art without departing, from the spirit of the disclosure.

In summary, the present invention discloses the mesh network system and the mesh network system communication method of the same having data flow transmission sorting mechanism that determine a priority rank of outward data flows and inward data flows according to the detection of the portal network device such that the priority ranking information is transmitted to mesh network devices in the mesh network system to allow the whole mesh network system to perform transmission of the outward data flows and the inward data flows according to the priority ranking information. The data transmission efficiency of the whole system is thus increased.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A mesh network system communication method having data flow transmission sorting mechanism, comprising:
   managing a plurality of computing devices to perform communication with an external network through a plurality of mesh network devices and a portal network device by a portal network device connected between the external network and the mesh network devices;
   detecting a plurality of outward data flows and a plurality of inward data flows related to the computing devices by the portal network apparatus;
   determining device priority information according to whether the computing devices that the outward data flows and the inward data flows correspond to is in a computing device white list or a computing device black list by the portal network device;
   determining relative flow amount information according to a relative flow amount between each two of the outward data flows and the inward data flows by the portal network device;
   performing priority ranking on the outward data flows and the inward data flows according to the device priority information and the relative flow amount information that the outward data flows and the inward data flows correspond to by the portal network device, to rank the outward data flows and the inward data flows that correspond to conditions in an order of being in the computing device white list, having a relatively smaller flow amount, having a relatively larger flow amount and being in the computing device black list from a highest rank to a lowest rank, so as to generate outward priority ranking information and inward priority ranking information; and
   transmitting the outward priority ranking information and the inward priority ranking information to the mesh network devices by the portal network device such that the mesh network system transmits the outward data flows and the inward data flows respectively according to the outward priority ranking information and the inward priority ranking information.

2. The mesh network system communication method of claim 1, wherein the plurality of computing devices are station devices including a smartphone, a tablet PC, a notebook PC, and a desktop that are equipped with network communication function.

3. The mesh network system communication method of claim 1, further comprising:
   determining whether the computing devices are in the computing device white list or the computing device black list according to identification information of each of the computing devices that the outward data flows and the inward data flows correspond to by the portal network device.

4. The mesh network system communication method of claim 1, wherein the outward priority ranking information is used to assign a priority order value to each of the outward data flows, and the mesh network system communication method further comprises:
   setting a priority queue according to the priority order value of each of the outward data flows by the portal network device and the mesh network devices to perform packet transmission.

5. The mesh network system communication method of claim 1, wherein the inward priority ranking information is used to assign an entry value corresponding to a class entry to each of the inward data flows, and the mesh network system communication method further comprises:
   setting the entry value corresponding to the class entry of each of a plurality of packets in each of the inward data flows by the portal network device to perform packet transmission with the mesh network devices and the computing devices.

6. The mesh network system communication method of claim 5, wherein the class entry is a DSCP entry of an IP header of the packets.

7. The mesh network system communication method of claim 6, wherein the mesh network devices perform packet transmission based on a WMM access class that the entry value of the DSCP entry, assigned according to the inward priority ranking information, corresponds to.

8. A mesh network system having data flow transmission sorting mechanism, comprising:
   a plurality of computing devices;
   a plurality of mesh network devices; and
   a portal network device electrically coupled between an external network and the mesh network devices and configured to:
     manage the computing devices to perform communication with the external network through the mesh network devices and the portal network device;
     detect a plurality of outward data flows and a plurality of inward data flows related to the computing devices;
     determine device priority information according to whether the computing devices that the outward data flows and the inward data flows correspond to is in a computing device white list or a computing device black list;
     determine relative flow amount information according to a relative flow amount between each two of the outward data flows and the inward data flows;
     perform priority ranking on the outward data flows and the inward data flows according to the device priority information and the relative flow amount information that the outward data flows and the inward data flows correspond to, to rank the outward data flows and the inward data flows that correspond to conditions in an order of being in the computing device white list, having a relatively smaller flow amount, having a relatively larger flow amount and being in the computing device black list from a highest rank to a lowest rank, so as to generate outward priority ranking information and inward priority ranking information; and
     transmit the outward priority ranking information and the inward priority ranking information to the mesh network devices such that the mesh network system transmits the outward data flows and the inward data flows respectively according to the outward priority ranking information and the inward priority ranking information.

9. The mesh network system of claim 8, wherein the plurality of computing devices are station devices including a smartphone, a tablet PC, a notebook PC, and a desktop that are equipped with network communication function.

10. The mesh network system of claim 9, wherein the portal network device determines whether the computing devices are in the computing device white list or the computing device black list according to identification information of each of the computing devices that the outward data flows and the inward data flows correspond to.

11. The mesh network system of claim 8, wherein the outward priority ranking information is used to assign a priority order value to each of the outward data flows, and the portal network device and the mesh network devices set a priority queue according to the priority order value of each of the outward data flows to perform packet transmission.

12. The mesh network system of claim 8, wherein the inward priority ranking information is used to assign an entry value corresponding to a class entry to each of the inward data flows, and the portal network device sets the entry value corresponding to the class entry of each of a plurality of packets in each of the inward data flows to perform packet transmission with the mesh network devices and the computing devices.

13. The mesh network system of claim 12, wherein the class entry is a differentiated services code point (DSCP) entry of an Internet protocol (IP) header of the packets.

14. The mesh network system of claim 13, wherein the mesh network devices perform packet transmission based on a Wi-Fi Multimedia (WMM) access class that the entry value of the DSCP entry, assigned according to the inward priority ranking information, corresponds to.

\* \* \* \* \*